April 15, 1969

V. G. CHIBAEFF 3,438,532

STORAGE VESSEL

Filed Feb. 6, 1967

INVENTOR
V. G. Chibaeff

BY *Marn & Jangarathis*

ATTORNEYS

April 15, 1969  V. G. CHIBAEFF  3,438,532
STORAGE VESSEL

Filed Feb. 6, 1967  Sheet 2 of 2

INVENTOR
V. G. Chibaeff
BY *Marn & Jangarathis*
ATTORNEYS

3,438,532
Patented Apr. 15, 1969

3,438,532
STORAGE VESSEL
Vadim G. Chibaeff, Paris, France, assignor to The Lummus Company, New York, N.Y., a corporation of Delaware
Filed Feb. 6, 1967, Ser. No. 614,326
Int. Cl. B65d 25/24
U.S. Cl. 220—1                         14 Claims

ABSTRACT OF THE DISCLOSURE

This invention relates generally to storage vessels and, more particularly, it relates to a vessel or tank for storing fluids under pressure, having a generally ellipsoidal equatorial section and spherical bottom and top sections. The invention is characterized by an increased cross sectional area in the equatorial plane, by reduced hoop stresses over a large portion of the total area, by a reduction of the pressure on the supporting soil as compared to conventional high pressure storage spheres, and by economy of construction, particularly if the vessel is made of reinforced concrete.

Disclosure

Heretofore, high pressure storage tanks have been generally spherical, since a sphere has the smallest surface area for a given capacity, and requires minimum shell thickness, compared to other possible shapes. Shell thickness ($e$) is defined by the following expression:

$$e = \frac{pR}{2s} \quad (1)$$

where:
$p$=design pressure
$R$=radius
$s$=allowable stress, joint efficiency included.

In a sphere, the ratio ($k_{sp}$) of vessel weight to vessel capacity is defined as follows:

$$k_{sp} = \frac{P}{V} = \frac{3p}{2s} g \quad (2)$$

where $g$ is the density of the shell material. For long cylindrical vessels such as the "bullets" commonly used for storage of liquefied petroleum gas (LPG), this ratio tends to reach a minimum value. At infinite length it corresponds to:

$$\frac{P}{V} = \frac{2p}{s} = \frac{4K_{sp}}{3} \quad (3)$$

Thus, such bullets weigh at least 34% more than spheres of the same capacity and, since tanks of this type are usually built in groups, and fewer spherical tanks would be required to handle a specific volume of fluid, the difference in weight is further increased due to the various nozzles, saddles and other fittings required as auxiliary equipment for each tank. A sphere is thus a more satisfactory geometric configuration than a bullet for high pressure storage tanks.

A spherical tank may, however, put heavy pressure per unit area on the supporting soil, and such structures thus often require elaborate foundations, and in some instances their size is limited because of insufficient soil supporting capacity.

In order to achieve structural efficiency approaching that of spherical tanks, i.e., uniform shell stress and reduced weight for a given capacity, various tank designs have been developed.

The well-known Horton spheroid is a noded structure requiring internal structural members which distribute stresses at the junction of two different nodes having different radii of curvature on the meridian. The shape of the Horton spheroid results from the stress distribution caused by liquid load on the bottom and vapor pressure on the dome. Such tanks are suitable for low pressure storage, as for example of natural gasolines, but they are not adapted for high pressure storage, where the additional load due to liquid weight can be neglected for shell stress purposes.

It is thus a general object of the present invention to provide an improved vessel for high pressure storage.

Another object of the invention is to provide an improved vessel for use as a high pressure storage tank wherein unit soil pressure is less than for a comparable spherical tank.

Still another object of this invention is to proivde an improved high pressure storage tank which is economical to construct, and which may be built from prestressed concrete sections as well as from steel or other conventional materials.

Yet another object of this invention is to provide a high pressure storage tank having lower hoop stresses than comparable spherical structures.

Various other objects and advantages of the invention will become clear from the following detailed discussion and mathematical analysis of two embodiments thereof, and the novel features will be particularly pointed out in connection with the appended claims.

In essence, the present invention comprises a vessel of reduced height and increased equatorial diameter, which because of the increase in its projected ground area reduces unit pressure on the soil and decreases the need for elaborate foundations. The equatorial section of the vessel is of a generally ellipsoidal shape and the top and bottom sections are spherical, the cheaper to manufacture spherical sections accounting for 50% or more of the total surface area. Reduction in height, as compared to a comparable sphere, is of the order of 20–25% but, as must be expected in any deviation from spherical shape, there is a slight increase in vessel weight. This weight increase, however, is offset by the savings in other materials, and for soils with low bearing values, by the reduction of unit pressure on the soil, as is more fully explained hereinbelow.

In a preferred embodiment, the vessel is a body of revolution, the total surface of which is in tension for stability of equilibrium. The variation of radius of curvature along the meridian is continuous, and the radii of curvature at the junction of the ellipsoidal and spherical sections are the same, thus superposing their tangents at that point.

Further reduction of the ratio between height and width is possible, but this results in compressive stresses along the equator of the surface which require the use of reinforcing rings to maintain rigidity and stability of equilibrium.

For vessels constructed of prestressed, reinforced concrete, a considerable reduction of hoop stresses in the vicinity of the equator enables substantial savings in reinforcing steel to be effected. Also, this shape minimizes lateral reaction on the vessel supports.

An understanding of the invention will be facilitated by referring to the accompanying drawings in which.

Figure 1:
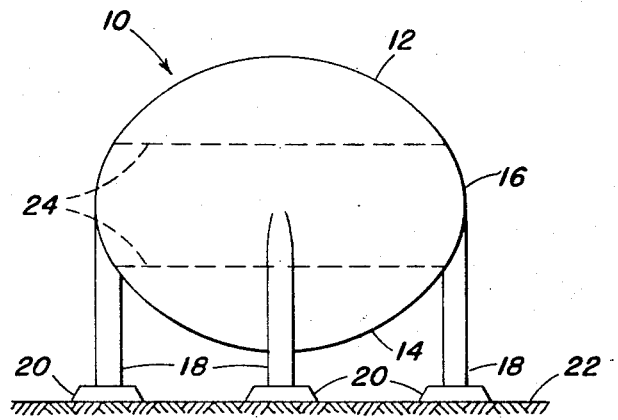
FIGURE 1 is an elevation of a preferred embodiment of a tank constructed according to the present invention.

As can be seen in FIG. 1, a complete tank constructed according to the present invention comprises a shell 10 having upper and lower spherical sections 12 and 14 respectively and an elliptical center section 16, conventional vertical support pillars 18 such as the type used to support ordinary propane storage spheres, and mat type foundations 20 set in soil 22 and designed to achieve a uniform distribution of pressure on the supporting soil. The lines of juncture between the spherical and ellipsoided sections of the vessel are shown as dotted lines 24. The method of determining the location of these lines and thereby laying out the vessel for fabrication will be discussed in detail hereinafter.

Figure 2:
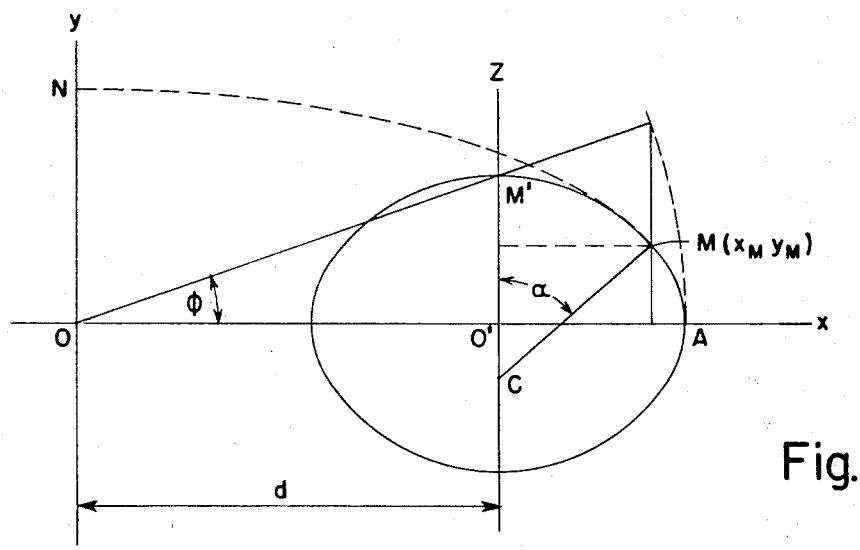
FIGURE 2 is a plot showing the determination of the vertical meridian of the vessel of FIGURE 1.

Determination of the meridian of the vessel of FIG. 1 is illustrated graphically in FIG. 2 and is discussed below. While the entire meridian is shown on the drawing, development thereof will be discussed with reference to a single quadrant, namely O'AM'.

The meridian of the surface comprises an ellipse arc AM and a circle arc MM'. The axis of revolution O'Z is parallel to the minor axis of the ellipse Oy, and is at a distance $d$ therefrom. It is required that the center of curvature of the ellipse at point M be located on O'Z. The basic equation of the ellipse is:

$$\frac{x^2}{a^2}+\frac{y^2}{b^2}=1 \quad (4)$$

where:
$2a$=major axis
$2b$=minor axis

In the coordinate system $x$–$y$ any point M on the ellipse curve AM will be defined by $x_M$ and $y_M$. However, it is more convenient to use parametric representation. For this purpose, a line normal to the abscissa and passing through point M intersects a circle of radius OA and subtends an angle $\phi$ at O. Under these conditions, $$x_M = a \cos \phi \quad (5)$$
$$y_M = Ka \sin \phi \quad (6)$$

where $K=b/a$. Using these parameters, it can be shown that $$d = a \cos^3 \phi (1-K^2) \quad (7)$$

$$CO' = \frac{a}{K} \sin^3 \phi (1-K^2) \quad (7')$$

where C is the point of intersection between the common normal to the ellipsoidal and spherical section, and the axis O'Z. It is obvious from FIG. 2 and the foregoing that $$OA = a$$
$$ON = b = Ka$$
$$CM = CM' = R'$$
$$O'A = a-d = R$$

Further, since the radius of curvature of the ellipse at M is R', and:

$$R' = \frac{a}{K}[1-\cos^2 \phi (1-K^2)]^{3/2} \quad (8)$$

and since the equatorial radius of the surface of revolution is R, the ratio $Z=R'/R$ is defined by the expression:

$$Z = \frac{R'}{R} = \frac{[1-\cos^2 \phi (1-K^2)]^{3/2}}{K[1-\cos^3 \phi (1-K^2)]} \quad (9)$$

The ratio $\lambda$ of overall height to overall width of the surface of revolution is related:

$$\lambda = \frac{R'-CO'}{R}$$

$$\lambda = Z - \frac{\sin^3 \phi (1-K^2)}{K[1-\cos^3 \phi (1-K^2)]} \quad (10)$$

It can be seen that this ratio decreases when $\phi$ increases or when K decreases, the influence of $\phi$ being more predominant.

If $\alpha$ is the half center angle at point C for the spherical portion of the surface of revolution, then $$\sin \alpha = \frac{x_m - d}{R'} \quad (11)$$

or, in parametric form, $$\sin \alpha = \frac{K \cos \phi}{\sqrt{1-\cos^2 \phi (1-K^2)}} \quad (11')$$

Figure 3:
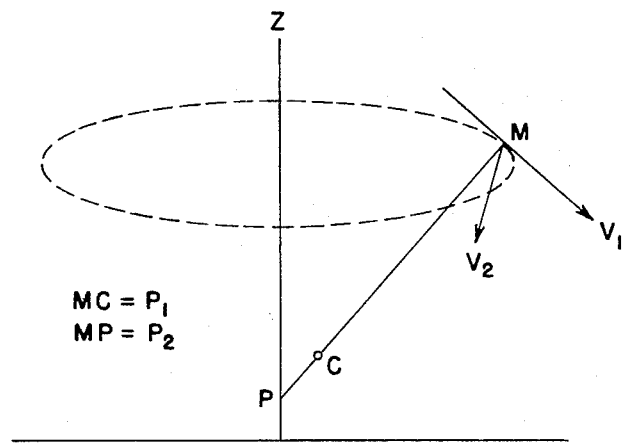
FIGURE 3 is a plot illustrating the determination of surface stresses in vessels constructed according to the present invention.

With these basic relations established, it is possible to etablish the main stresses at any point on the surface of revolution. Referring now to FIG. 3, if $v_1$ and $v_2$ are the two main stresses along the meridian and parallel to any point M of the surface of revolution, $\rho_1$ is the radius of curvature of the meridian at M (i.e., $\rho_1=MC$) and $\rho_2$ is the second radius of main curvature (i.e., MP the distance along the normal from M to the axis of revolution), then the following basis relations must hold:

$$\frac{v_1}{\rho_1}+\frac{v_2}{\rho_2}=\frac{P}{e} \quad (12)$$

$$v_1 = \frac{P\rho_2}{2e} \quad (13)$$

$$v_2 = \frac{P\rho_2}{2e}\left(2-\frac{\rho_2}{\rho_1}\right) \quad (14)$$

where P is the internal pressure and $e$ is the wall thickness of the surface.

To provide stable equilibrium, $v_1$ and $v_2$ must be positive, so there are no compressive stresses, and consequently $$\rho_2/\rho_1 < 2 \quad (15)$$

In the instant case $\rho_2/\rho_1$ has its maximum value along the equator at point A, and decreases from point A to point M where the ratio has a value of unity.

The radius of curvature of the ellipse at A can be expressed as:

$$\rho_1 = \frac{b^2}{a} = K^2 a \quad (16)$$

$$\rho_2 = R = a[1-\cos^3 \phi (1-K^2)] \quad (17)$$

This implies that $\rho_2/\rho_1 < 2$ and from this K is:

$$K > \sqrt{\frac{1-\cos^3 \phi}{2-\cos^3 \phi}} \quad (18)$$

At point A the greatest stress is:

$$v_1 = PR/2e \quad (19)$$

along the meridian. If we call $s$ the allowable stress, joint efficiency included, the required minimum wall thickness at this point is:

$$e = PR/2s \quad (20)$$

At points along the ellipse between A and M, $v_1$ increases slowly and $v_2$ increases much more rapidly until at M, which is the junction of the ellipsoidal and spherical sections, $$v_1 = v_2 = PR'/2e' \quad (20')$$

and the theoretrical required wall thickness at M is:

$$e' = PR'/2s \quad (21)$$

as a result of this, $$e'/e = R'/R = Z \quad (22)$$

If the vessel is to have a uniform wall thickness, the ratio Z should be kept below 1.1 to avoid surplus weight (basing thickness on Equation 20) since localized stresses exceeding nominal shell stress by approximately 10% are permissible and always occur at the junction of shell and elliptical heads on all pressure vessels.

It is desired to reduce the ratio of overall height to overall width ($\lambda$) as much as possible within these limits. The limiting value of K is determined from Equation 18, that is:

$$K = \sqrt{\frac{1-\cos^3 \phi}{2-\cos^3 \phi}} \quad (18')$$

and for this value Equations 7, 9, 10, 11' can be expressed as follows:

$$d = \frac{a \cos^3 \phi}{2 - \cos^3 \phi} \quad (7')$$

$$z = \frac{1}{2}\left[\frac{2-\cos^3 \phi - \cos^2 \phi}{1-\cos^3 \phi}\right]^{3/2} \quad (9')$$

$$\lambda = Z - \frac{\sin^3 \phi (2-\cos^3 \phi)^{1/2}}{2(1-\cos^3 \phi)^{3/2}} \quad (10')$$

$$\sin \alpha = \cos \phi \left[\frac{1-\cos^3 \phi}{2-\cos^2 \phi - \cos^3 \phi}\right]^{1/2} \quad (11'')$$

It can be seen that for small values of $\phi$, $\phi$ can be substituted for $\sin \phi$ and $$1 - \frac{\phi^2}{2}$$

can be substituted for $\cos \phi$, so that:

$$\lim_{\phi \to 0} Z = 1.075 \quad (23)$$

and that Z is an increasing function of $\phi$. Similarly, $$\lim_{\phi \to 0} \lambda = 0.803 \quad (24)$$

$$\lim_{\phi \to 0} \sin \alpha = \frac{\sqrt{3}}{2} \quad (25)$$

so $\alpha = 60°$ and is a decreasing function of $\phi$. Similar calculations can be made for the other limit, where $\phi = 90°$ (i.e., the surface is entirely ellipsoidal) and for intermediate values, as summarized hereinbelow in table. For each value of $\phi$ the limit value of K is given as well as the effective value, for which $\lambda$, Z and $\alpha$ have been calculated to insure tension along the equator.

TABLE

| $\phi°$ | K lim. | K eff. | $\lambda$ | Z | $\alpha°$ | $d\alpha$ | $R\alpha$ |
|---|---|---|---|---|---|---|---|
| 45 | 0.628 | 0.66 | 0.77 | 1.15 | 33°30' | 0.199 | 0.801 |
| 30 | 0.508 | 0.55 | 0.80 | 1.089 | 44° | 0.453 | 0.547 |
| 20 | 0.381 | 0.40 | 0.81 | 1.082 | 48° | 0.697 | 0.303 |
| 10 | 0.206 | 0.20 | 0.81 | 1.060 | 51°20' | 0.909 | 0.091 |

It can be seen from the above table that the surface can be satisfactorily defined for values of $\phi$ between 10° and 20°.

Figure 4:
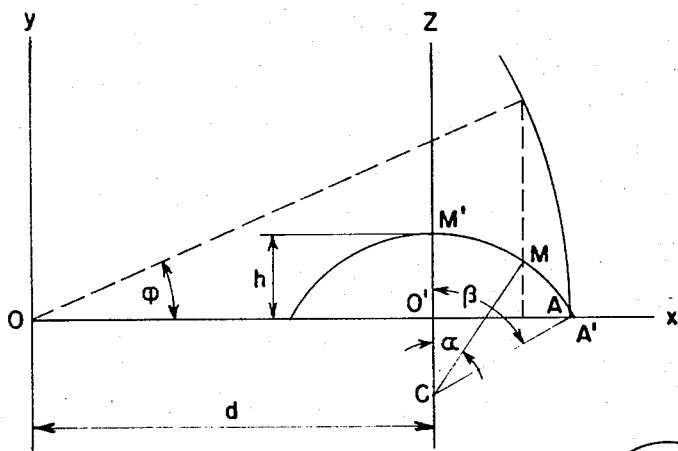
FIGURE 4 is a plot illustrating the determination of volume, weight and soil pressure for vessels constructed according to the present invention.

The volume of the tank, its weight and soil pressure can also be calculated and compared to a spherical container. In FIG. 4, $O'A = R$, and $CM = R'$, as previously. It can be shown that $CA/R < Z$ and tends to 1.034 as $\phi$ approaches zero. For values of $\phi$ of 20° or less, a good approximation of the volume (V) and surface (S) of the vessel can be obtained by considering it as the sum of two spherical segments of center C and radius R' with a height $h$. It is obvious that $h = O'M' = R' - O'C$. In parametric terms, $$h = R' - \frac{a}{K} \sin^3 \phi (1-K^2) \quad (26)$$

The total volume of each spherical segment is $$V_{1/2} = \frac{\pi h^2}{3}(3R' - h) \quad (27)$$

and the surface is $$S_{1/2} = 2\pi R' h \quad (28)$$

The total volume can be expressed in parametric terms, by substituting Equation 26 for $h$ and Equation 8 for R':

$$V = 2 \times V_{1/2} = \frac{2\pi a^3}{3K^3}[(1-\cos^2 \phi)(1-K^2)]^{3/2} - \sin^3 \phi$$

$$(1-K^2)]^2 \cdot [2(1-\cos^2 \phi (1-K^2)]^{3/2} + \sin^3 \phi)(1-K^2)] \quad (29)$$

For $\phi = 20°$ ($K = 0.40$), the following can thus be determined:

$R' = 0.327a$
$R = 0.303a$
$h = 0.243a$
$V_{1/2} = 0.0456a^3$
$S_{1/2} = 0.499a^2$ $$e = 0.303 \frac{ap}{2s}$$

The weight of the container is $$gse = 0.151 \frac{a^3 pg}{2s} \quad (30)$$

where $p$ is design pressure, $s$ is allowable stress, and $g$ is the density of the material. Weight per unit volume is $$\frac{gse}{v} = 3.31 \frac{pg}{2s} \quad (31)$$

Since, for a sphere, weight per unit volume is $$\frac{3p}{2s} g$$

the weight increase in the present container is 3.31/3, or about 10%.

The radius R'' of the sphere having the same volume as the tank results from the following equation:

$$2\pi R''^3/3 = 0.0456a^3 \quad (32)$$

Consequently:

$R'' = 0.279a$
$R''/R = 0.92$

Since the weight per unit volume of the container is 10% higher than corresponding weight for the sphere, the pressure on the soil is reduced in the ratio of $$1.1 \times 0.92^2 = 0.93$$

It can be shown that the reduction of the moment due to the wind is approximately equal to the flattening ratio $\lambda$ which is of 0.81 in the considered case. For strong winds and average design pressures in the range of 150 lbs./sq. in., the additional stress due to the wind can amount on large vessels to 15% or more of that due to the weight of the vessel, and of the fluid it contains, resulting in a total reduction of the stress on the soil of approximately 10% for the given example.

If it is desired to reduce tank height by more than 20% with respect to corresponding full sphere height, the values taken for K must be smaller than the limit values as calculated supra, Table I. This will result in compressive stresses along parallels in the vicinity of the tank equator and will consequently require reinforcing rings along the equator or other appropriate supports to induce tension at the equator so as to maintain rigidity. Such supports are preferably placed outside the vessel.

Figure 5:
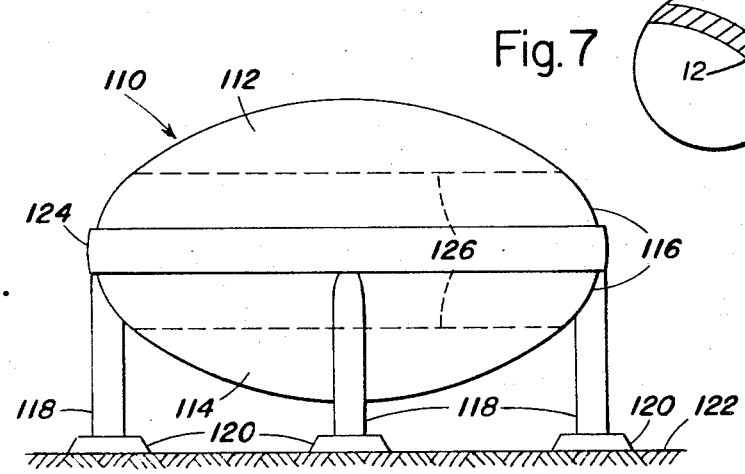
FIGURE 5 is an elevation of a second embodiment of a tank constructed in accordance with the present invention.
Figure 7:
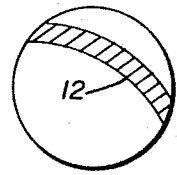
FIGURE 7 is a typical partial cross-sectional view of the tank of FIGURE 1 manufactured of steel.

FIG. 5 shows a tank constructed in accordance with the present invention having a shell 110 comprising upper and lower spherical sections 112 and 114 respectively and an elliptical center section 116, conventional vertical support pillars 118 such as the type used to support ordinary propane storage spheres, and mat type foundations 120 set in soil 122 and designed to achieve a uniform distribution of pressure on the supporting soil. Structural support ring 124 centrally girds elliptical section 116 and is sufficiently wide to reinforce that band of the ellipsoid which would otherwise be in compression. The junctures between the spherical and ellipsoidal sections 112, 114 and 116 are shown by broken lines 126. As can be seen from FIG. 5, the support rings 124 do not necessarily extend the full width of elliptical section 116, but rather their width is determined by a stress analysis for each tank design.

Figure 6:
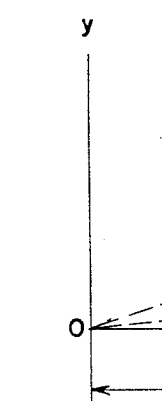
FIGURE 6 is a plot showing the determination of the location of equatorial support rings for the vessel of FIGURE 5.
Figure 8:
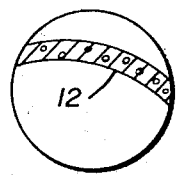
FIGURE 8 is typical partial cross-sectional view of the tank of FIGURE 1, manufactured of concrete.

The width of the rings required can be determined by locating the point $M''$ on the elliptical section for which stress $V_2$ along the parallel (see FIG. 6) is equal to 0, that is, where $\rho_2/\rho_1=2$. This is accomplished by establishing $CM'=2\rho_1$ (FIG. 4) and developing the relationship as was done in determining distance $d$ supra. The corresponding equation would thus read:

$$2(1-K^2)x_{M''}^3 - a^2 x_{M''} - a^2 d = 0 \tag{33}$$

Noting that for a vessel having angle $\phi=20°$, the corresponding $K$ limit $=0.381$, a value of $K=0.36$ will be established to show a bandwidth determination. The geometric characteristics associated with $K=0.36$ are:

$$1-K^2=0.87 \tag{34}$$

and since $\cos \phi=0.9397$ and $\sin \phi=0.342$, $$\lambda=\frac{[1-\cos^2 \phi(1-K^2)]^{3/2}-\sin^3 \phi(1-K^2)}{K[1-\cos^3 \phi(1-K^2)]}=0.76 \tag{35}$$

$$d=a \cos^3 \phi(1-K^2)=0.722a \tag{36}$$

Therefore, $$1.74x^3-a^2x-0.722a^3=0 \tag{37}$$

The root of (36) is $x_{M''}=0.995a$ which corresponds to a parametric angle of $\phi'=5°40'$. Correlated center angle $\gamma'$ in $0'$ (see FIG. 4) is defined by its tangent:

$$\text{Tan } \gamma'=\frac{Y_{M''}}{x_{M''}-d}=\frac{ka \sin \phi}{(0.995-0.722)a}=0.128 \tag{38}$$

$\gamma'=7°18'$.

Likewise, angle $\gamma$ corresponding to M is defined by $$\text{Tan } \gamma=\frac{ka \sin \phi}{a \cos \phi-d}=0.564 \tag{39}$$

Therefore, $\gamma=29°30'$.

By thus establishing the angle which defines the line of common tangency between the spherical sections and the elliptical section, and $\gamma'$, the angle which defines the line of zero stress along the elliptical section, the lines between which reinforcing must be provided have been established.

As is evident from FIG. 5, the lowering and broadening of the tank shell results in a greater projected horizontal area and therefore a still further distribution of weight per unit soil area. Accordingly, larger size vessels per unit earth area may be contemplated through the use of this invention.

What is claimed is:
1. A vessel for containing fluid comprising:
   a shell having a height to diameter ratio of less than unity, said shell having:
      an upper spherical portion;
      a lower spherical portion; and
      an ellipsoidal portion between said upper spherical portion and said lower spherical portion;
      means engaging said ellipsoidal portion for supporting said vessel; and
      wherein the lines of juncture between said ellipsoidal and spherical portions occur at the points of common radius of curvature and tangency.
2. The vessel as claimed in claim 1, wherein said height to diameter ratio is lower than unity and above about 0.8, wherein said shell contains a pressurized fluid so as to generate outwardly directed forces and place said shell entirely in tension, and wherein said shell is manufactured from material of constant thickness.
3. The vessel as claimed in claim 1, wherein said height to diameter ratio is less than 0.8, wherein said shell contains a pressurized fluid so as to generate outwardly directed forces to place said upper and lower spherical portions in tension and the central portion of said ellipsoidal portion is in compression, and wherein rings are circumferentially mounted on the external surface of said central portion of said shell whereby to redistribute hoop stresses.
4. The vessel as claimed in claim 2, wherein the material of said vessel is steel.
5. The vessel as claimed in claim 2, wherein the material of said vessel is reinforced concrete.
6. The vessel as claimed in claim 3, wherein the material of said vessel is steel.
7. The vessel as claimed in claim 3, wherein the material of said vessel is reinforced concrete.
8. The vessel as claimed in claim 3, wherein said circumferentially mounted rings are mounted on the ellipsoidal portion of said shell which is in compression.
9. The vessel as claimed in claim 3, wherein said circumferentially mounted rings are coextensive in width to said central portion of said ellipsoidal portion which is in compression.
10. A structure for containing fluid, said structure comprising:
    foundation means;
    support means mounted on said foundation means; and
    a shell mounted on and supported by said support means, said shell having a height to diameter ratio of less than unity and comprising an upper spherical portion, a lower sperical portion, and an ellipsoidal portion between said upper and lower spherical portions, and wherein the lines of juncture between said ellipsoidal and spherical portions occur at the points of common radius of curvature and tangency.
11. The vessel as claimed in claim 10, wherein said height to diameter ratio is less than unity and above about 0.8, and wherein said shell contains a pressurized fluid so as to generate outwardly directed forces and place said shell entirely in tension, and wherein said shell is manufactured from material of constant thickness.
12. The vessel as claimed in claim 10, wherein said height to diameter ratio is less than 0.8, wherein said shell contains a pressurized fluid so as to generate outwardly directed forces to place said upper and lower spherical portions in tension and the central portion of said ellipsoidal portion is compression, and wherein rings are circumferentially mounted on the external surface of said central portion of said shell whereby to redistribute hoop stresses.
13. The vessel as claimed in claim 12, wherein said circumferentially mounted rings are mounted on the ellipsoidal portion of said shell which is in compression.

14. The vessel as claimed in claim 13, wherein said circumferentially mounted rings are coextensive in width to said central portion of said ellipsoidal portion which is in compression.

References Cited

UNITED STATES PATENTS

| | | |
|---|---|---|
| 1,997,808 | 4/1935 | Backburn. |
| 2,562,601 | 7/1951 | Caquot et al. _____ 220—18 X |
| 2,562,602 | 7/1951 | Caquot et al. _____ 220—18 X |
| 2,961,118 | 11/1960 | Miller et al. _____ 220—18 |
| 3,019,806 | 2/1962 | Pirok et al. _____ 220—18 X |

FOREIGN PATENTS

| | | |
|---|---|---|
| 993,903 | 8/1951 | France. |
| 1,275,701 | 10/1961 | France. |

RAPHAEL H. SCHWARTZ, *Primary Examiner.*

U.S. Cl. X.R.

52—80, 194; 220—18